United States Patent
Supanc et al.

(10) Patent No.: US 9,672,470 B2
(45) Date of Patent: Jun. 6, 2017

(54) NETWORK-PROBABILITY RECOMMENDATION SYSTEM

(71) Applicant: Pearson Education, Inc., New York, NY (US)

(72) Inventors: Patrick M. Supanc, Boston, MA (US); Pedro Martello, Boston, MA (US); James Mills, Boston, MA (US); Johann A. Larusson, Waltham, MA (US); Robyn L. Lewis, Boston, MA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

(21) Appl. No.: 14/941,119

(22) Filed: Nov. 13, 2015

(65) Prior Publication Data

US 2016/0071019 A1   Mar. 10, 2016

Related U.S. Application Data

(63) Continuation of application No. 13/932,356, filed on Jul. 1, 2013, now Pat. No. 9,189,968.

(51) Int. Cl.
   *G06N 7/00*   (2006.01)
   *G06N 3/08*   (2006.01)
   *G06N 99/00*  (2010.01)
   *G09B 7/02*   (2006.01)

(52) U.S. Cl.
   CPC .............. *G06N 7/005* (2013.01); *G06N 3/08* (2013.01); *G09B 7/02* (2013.01); *G06N 99/005* (2013.01)

(58) Field of Classification Search
   None
   See application file for complete search history.

(56) References Cited

U.S. PATENT DOCUMENTS

| | | | |
|---|---|---|---|
| 6,484,010 B1 | 11/2002 | Sheehan | |
| 6,808,392 B1 | 10/2004 | Walton | |
| 8,033,831 B2 | 10/2011 | Julia et al. | |
| 8,052,426 B2 | 11/2011 | Snyder et al. | |
| 8,753,200 B1 | 6/2014 | Supanc et al. | |
| 2004/0009461 A1 | 1/2004 | Snyder et al. | |
| 2005/0060221 A1 | 3/2005 | Kolar et al. | |
| 2007/0292826 A1 | 12/2007 | Goddy et al. | |

(Continued)

OTHER PUBLICATIONS

Dolong, et al., "Personalization in Distributed e-Learning Environments," WWW2004, May 17-22, 2004, New York, New York, p. 170-179.

(Continued)

*Primary Examiner* — Stanley K Hill
*Assistant Examiner* — Mikayla Chubb
(74) *Attorney, Agent, or Firm* — Kilpatrick Townsend & Stockton LLP

(57) ABSTRACT

A method/apparatus/system for generating a recommendation based on user interactions with nodes and associated tasks within a prerequisite graph. The recommendation is generated by identifying the user's current position within the prerequisite graph and identifying potential next nodes to which the user could move. Based on the user's past interactions with nodes and/or tasks within the prerequisite graph, the user's likelihood of successfully completing the potential next node is calculated, and a recommendation is made based on this calculated likelihood of the user successfully completing the potential next node.

20 Claims, 12 Drawing Sheets

(56) References Cited

U.S. PATENT DOCUMENTS

| | | |
|---|---|---|
| 2008/0040370 A1 | 2/2008 | Bosworth et al. |
| 2009/0075709 A1 | 3/2009 | Park |
| 2009/0197237 A1 | 8/2009 | Couch et al. |
| 2010/0041007 A1 | 2/2010 | Wang |
| 2010/0143873 A1 | 6/2010 | Keim et al. |
| 2011/0039242 A1 | 2/2011 | Packard et al. |
| 2011/0177480 A1 | 7/2011 | Menon et al. |
| 2011/0195389 A1 | 8/2011 | DeYoung et al. |
| 2012/0040326 A1 | 2/2012 | Larson-Rutter et al. |
| 2014/0024009 A1 | 1/2014 | Nealon et al. |
| 2014/0186810 A1 | 7/2014 | Falash et al. |
| 2014/0188442 A1 | 7/2014 | Zelenka et al. |
| 2014/0272905 A1 | 9/2014 | Boersma |

OTHER PUBLICATIONS

Hamalainen, et al., "Data Mining in Personalizing Distance Education Courses," Department of Computer Science, University of Joensuu, Finland, 2004. p. 1-16.

Quantiles.com; The Quantile Framework for Mathematics; Feb. 18, 2006. [online], retrieved on Feb. 9, 2014]. Retrieved from the Wayback Machine, archive.org. https://web.archive.org/web/20060218165157/http://www.quantiles.com/EntrancePageFlash.html?1.

NETWORK-PROBABILITY RECOMMENDATION SYSTEM

CROSS-REFERENCES TO RELATED APPLICATIONS

This application is a continuation of U.S. application Ser. No. 13/932,356, entitled "NETWORK-PROBABILITY RECOMMENDATION SYSTEM," and filed on Jul. 1, 2013, the entirety of which is hereby incorporated by reference herein.

BACKGROUND OF THE INVENTION

This disclosure relates in general, but not by way of limitation, to directed learning as within a Learning Management System (LMS), Online Homework System (OHS), and/or any other similar educational features, systems, or components such as, for example, a virtual learning environment (VLE) and a learning content management system (LCMS).

The advancement of a student through learning material is directed by a syllabus of curricula that organizes learning materials into a hierarchical structure. A syllabus divides subject areas into topics and divides those topics into learning objectives. The syllabus creates a rigid learning structure that outlines a single path for progressing through the learning material encompassed by the syllabus. Although syllabi have been used for a long time, new methods, techniques, and systems for directing learning are required.

BRIEF SUMMARY OF THE INVENTION

In one embodiment, the present disclosure provides a prerequisite graph. The prerequisite graph includes a plurality of leaf nodes that are interconnected based on a prerequisite relationship such that of two directly connected nodes, one is a prerequisite to the other, and such that every node in the prerequisite graph is directly or indirectly connected with every other node in the prerequisite graph. The prerequisite graph includes perimeter nodes for which there are no prerequisite nodes, and a central node that has at least one prerequisite node. The central node can, for example, be a prerequisite to another node, or also cannot be a prerequisite to any other node.

In one embodiment, the present disclosure provides a method of generating an individual network-probability based educational path. Information indicating that new learning material and/or advancement to a new node is requested and/or required is received. The user requesting the new learning material and/or advancement to a new node is identified, and/or information identifying the user requesting the new learning material and/or advancement to a new node is received. The location of the user within the prerequisite graph is determined and/or information indicating the location of the user within the prerequisite graph is received. The group of relevant nodes is identified, which group can optionally be identified according to a bounding rule. Uncompleted relevant nodes are identified and information relating to learning material associated with the relevant nodes is received. The information relating to learning material associated with the relevant nodes can include information identifying one or several tasks associated with the relevant nodes including, task type, task origin, and/or task status. Information relating to the user's interaction with the relevant nodes is received. This information relating to the user's interaction with completed nodes can include, for example, information identifying tasks completed by the user, the amount of time spent by the user on a task and/or at a node, and/or scores received by a user in completing a task and/or node. The node information relating to the relevant nodes and the information relating to the user's interaction with the relevant nodes is used to calculate the user's likelihood of successfully completing the uncompleted relevant nodes.

In one embodiment, the present disclosure provides a system for generating an individual network-probability based educational path. The system can include one or more hardware servers that receive information indicating that new learning material is requested and/or required. The one or more servers are programmed to receive identification of a user for whom the new learning material is requested and/or required. The one or more servers are programmed to receive an indication of the location and/or determine the location of the user within the prerequisite graph. The one or more servers are programmed to identify a group of relevant nodes and identify uncompleted relevant nodes. The relevant nodes can be optionally identified according to a bounding rule. The bounding rule can define the type and degree of association between nodes that results in the inclusion of a node by the bounding rule. The one or more servers are programmed to receive information relating to learning material associated with the relevant nodes and to receive user node information. The information relating to learning material associated with the relevant nodes can include information identifying task associated with the relevant nodes including, task type, task origin, and/or task status. The user node information can include information relating to the user's interaction with one or several nodes and/or relevant nodes. This can include the amount of time spent by the user at one or several nodes and/or on one or several tasks, completed tasks and/or nodes, scores received in completing one or several nodes and/or tasks, and/or any other information relating to the user's interaction with one or several nodes. The one or more servers are programmed to calculate the user's likelihood of successfully completing each of the uncompleted relevant nodes based on the collected information, and to identify a recommended next node for the user, and to provide the recommendation to the user. This calculation can be performed according to the Bayesian Network/model.

In one embodiment, the present disclosure provides a method of recommending an individual network-probability based educational task. The method can include receiving information indicating that new learning material is requested and/or required. An indication of the location of the user within the prerequisite graph can be received, and/or the location of the user within the prerequisite graph can be determined. Relevant nodes can be identified. These nodes can include one or both of completed and uncompleted nodes. These nodes can be identified by application of a bounding rule, such as a Markov blanket, to the prerequisite graph. The user's likelihood of successfully completing each of the uncompleted relevant nodes is calculated. This calculation can be performed using information relating to tasks that are part of the completed nodes and information relating to the user's interaction with the completed nodes. This information relating to the user's interaction with the completed nodes can include, for example, information identifying tasks completed by the user, the amount of time spent by a user on a task and/or at a node, and/or scores received by a user in completing a task and/or node. A recommendation threshold can be identified. The recommendation threshold can define a minimum likelihood of success to allow recommendation of a new node. This threshold can be identified by retrieving recommendation threshold data from a database. The node having the highest likelihood of success can be identified, and this likelihood of success can be compared to the recommended threshold. If the likelihood of success of the node having the highest likelihood of success does not meet the recommendation threshold, an additional task in one of the completed nodes is recommended.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
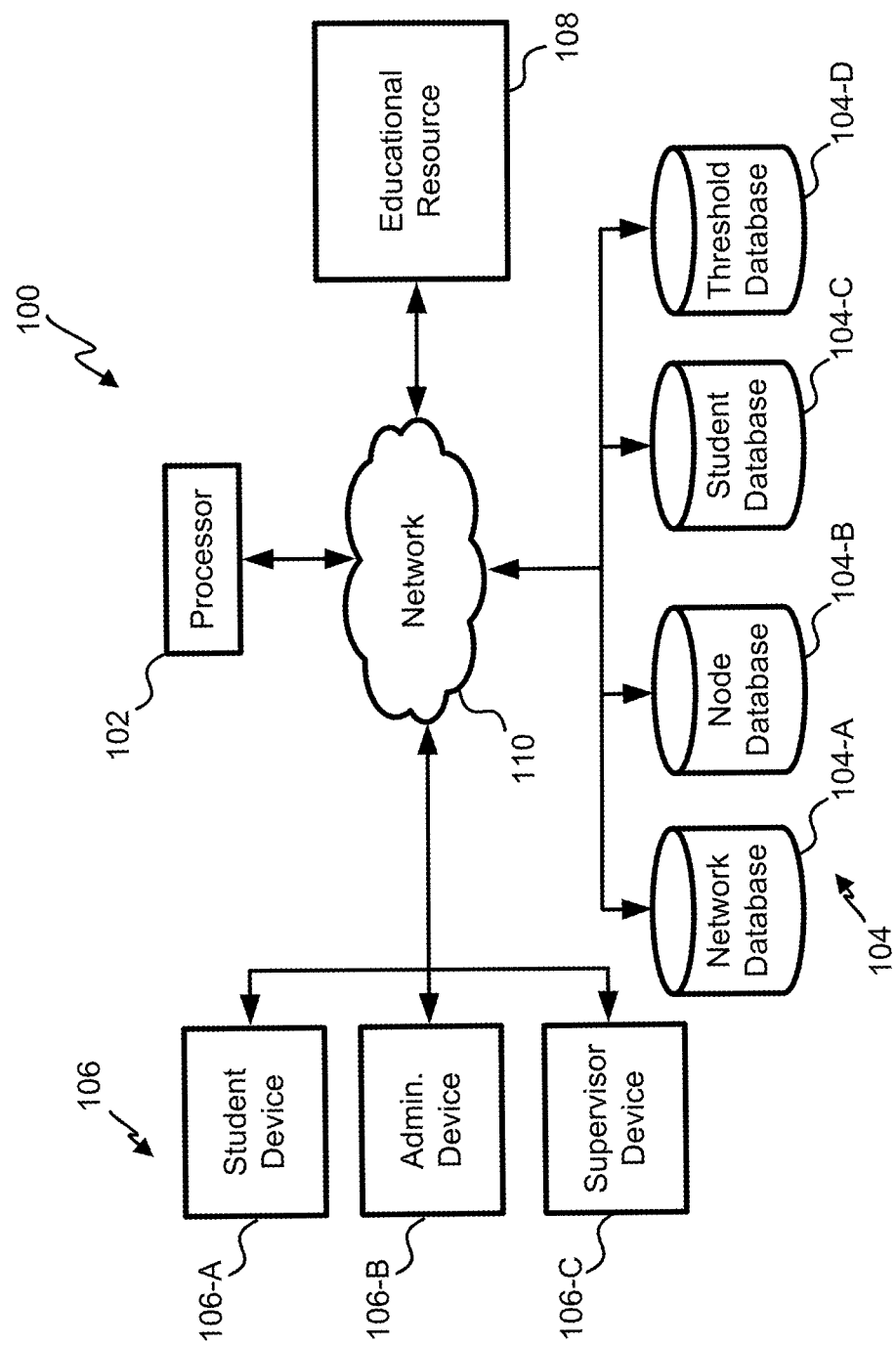
FIG. 1 depicts a block diagram of an embodiment of a network-probability recommendation system.

With reference now to FIG. 1, a block diagram of one embodiment of an network-probability recommendation system 100 is shown. The network-probability recommendation system 100 creates and/or receives the prerequisite graph and aggregates data relating to a user, and specifically relating to a student. The network-probability recommendation system 100 uses this data to recommend educational topics and/or one or several activities to the user. In some embodiments, the educational topics can be, for example, related to any defined subject matter, and the one or several activities can be, for example, one or several items by which the user experiences the subject matter of the educational topic. In one embodiment, the activities can include, for example, a learning activity which conveys the subject matter of the educational topic such as, for example, a video, a presentation, recording, or a text, a practice activity which allows a user to practice the subject matter of the educational topic such as, for example, one or several practice questions, assignments, or problems, and/or a challenge activity which can be used to ascertain and/or determine the user's level of mastery and/or comprehension of the subject matter of the educational topic. The challenge activity can include, for example, a quiz, a test, an assignment, and/or one or several questions or problems. In some embodiments, the practice activity and the challenge activity may differentiate themselves in that the practice activity may include features to facilitate learning during the task such as, for example, an immediate indicator of a user error and/or mistake, material to assist the user in providing a correct answer, and remedial material in the event of a user error and/or mistake, which features may not be included in the challenge activity.

The aggregated data relating to the user can include information relating to the user's interaction with one or more educational topics and/or activities including, for example, the user's progress in completing educational topics and/or activities and/or the user's level of proficiency in educational topics and/or activities. The network-probability recommendation system 100 can use the aggregated data and/or the prerequisite graph to recommend an educational path for a user, the educational path including, for example, one or several recommended educational topics and/or activities. In some embodiments, this educational path can be personalized to the user based on data collected by the network-probability recommendation system 100.

The network-probability recommendation system 100 can include a processor 102. The processor 102 can provide instructions to and receive information from the other components of the network-probability recommendation system 100. The processor 102 can act according to stored instructions, which stored instructions can be located in memory associated with the processor and/or in other components of the network-probability recommendation system 100. The processor 102 can comprise a microprocessor, such as a microprocessor from Intel® or Advanced Micro Devices, Inc.®, or the like.

The network-probability recommendation system 100 can include one or several databases 104. The one or several databases 104 can comprise stored data relevant to the functions of the network-probability recommendation system 100. The one or several databases can comprise any desired format. In some embodiments, for example, one or several of the one or several databases 104 can comprise, for example, a relational database and/or a graph database, which graph database can, in some embodiments, be configured for storing graphs or networks. The one or several databases 104 can include a network database 104-A. The network database 104-A can include information relating to and/or defining the prerequisite graph. In some embodiments, for example, the network database 104-A can include information identifying the nodes within the prerequisite graph and the relationship between the nodes of the prerequisite graph. The prerequisite graph can be generated by the network-probability recommendation system 100 and stored in the network database 104-A, and/or the prerequisite graph can be generated remote from the network-probability recommendation system 100 and stored in the network database 104-A.

The one or several databases 104 can include a node database 104-B. The node database 104-B can include information relating to one or several nodes. This information can include, for example, information identifying the educational topic associated with a node, and/or information relating to tasks associated with a node. In some embodiments, for example, a plurality of tasks may be associated with a node. The association of the tasks with the node, as well as the tasks themselves can be stored within the node database 104-B. In some embodiments, information stored in the node database 104-B can be generated within the network-probability recommendation system 100 and/or remote from the network-probability recommendation system 100. In some embodiments, the node database 104-B can further include information relating to a user's completion of the node and/or information relating to a user's completion of tasks within the node.

The network-probability recommendation system 100 can include a student database 104-C. The student database 104-C can include information relating to the user's interaction with the network-probability recommendation system 100.

In some embodiments, the student database 104-C can include information relating to the user's progress in the prerequisite graph. This information can include an indication of completed nodes and/or of uncompleted nodes, an indication of completed tasks and/or uncompleted tasks in each node, an indication of the amount of time spent on a node and/or on one or several tasks within a node, an indication of scores received on one or several tasks and/or at a node, user preferences, the number and/or types of tasks completed in each node, and/or any other desired information.

In some embodiments, the student database 104-C can include security information to secure access to the network-probability recommendation system 100 and filter information provided by the network-probability recommendation system 100. In some embodiments, for example, the access database can comprise login information. This information can include, for example, information identifying a user such as, for example, a username and password or a user identification number. In some embodiments, for example, when a user desires to access the network-probability recommendation system 100, the user can be prompted to enter identification information such as, for example, a username and password. After the user provides the identification information, the network-probability recommendation system 100 can verify the identification information, and specifically, the processor 102 can compare the user provided identification information to information stored within the access database to determine if the current user is an authorized user.

In some embodiments, after the processor 102 has determined whether the user is an authorized user, the processor 102 can determine the user's access level. This determination can include querying the student database 104-C for access information associated with the user provided identification information. In some embodiments, for example, the access level can correspond to the portions of the prerequisite graph that the user is allowed to access, tasks that the user is allowed to access, and/or actions the user is allowed to take. In some embodiments, for example, a user that is a student may be allowed to access nodes within the prerequisite graph corresponding to one or several lectures, seminars, courses, and/or courses of study to which the student is admitted such as, for example, by paying tuition for admission. In some embodiments, for example, the user that is a student may be allowed to access one or several tasks and/or task types within the prerequisite graph. In one embodiment, for example, a user that is an educator, an administrator, and/or a supervisor may be allowed to access and/or add one or several nodes within the prerequisite graph and/or tasks within one or several of the nodes of the prerequisite graph whereas a user that is a student may not have this level of access.

The network-probability recommendation system 100 can include a threshold database 104-D. The threshold database 104-D can include rules that direct the providing of recommendations. In some embodiments, these rules can indicate when a node and/or task within a node has been completed by a student, can indicate a level of the likelihood of success to be achieved before a recommendation is made for a user to advance to a different and/or new node or task, and/or can provide preference rules for recommending one or several tasks. In some embodiments, the rules stored within the threshold database 104-D can be generated in the network-probability recommendation system 100 and/or can be generated remote from the network-probability recommendation system 100.

The network-probability recommendation system 100 can include one or several user devices 106, which can include, a student device 106-A, an administrator device 106-B, and/or a supervisor device 106-C. The user devices 106 allow a user, including a student, a parent, and an educator, including a teacher, supervisor, and/or an administrator, to access the network-probability recommendation system 100. This access can be in the form of the student moving between nodes of the network-probability recommendation system 100 and receiving and/or completing tasks associated with those nodes, the student providing information to the network-probability recommendation system 100, the student providing answers to the network-probability recommendation system 100, the student receiving an evaluation and/or indicator of progress within a node and/or task and/or level of mastery of the subject matter of the node and/or task, an administrator receiving information indicative of the functioning of the network-probability recommendation system 100, the administrator providing updates and/or maintenance to the network-probability recommendation system 100, a supervisor such as, for example, a parent, a teacher, and/or a counselor receiving information from the network-probability recommendation system 100 indicative of student actions within the network-probability recommendation system 100 and/or the evaluation of student actions within the network-probability recommendation system 100. The details and function of the user devices 106 will be discussed at greater length in reference to FIG. 1A below.

The evaluation and optimization system 100 can include one or several educational resources 108. In some embodiments, for example, the educational resource can be the source of the prerequisite graph and/or the source of the content of one or several of the nodes. In some embodiments, for example, the educational resource 108 can be the source of one or several tasks associated with the node.

The network-probability recommendation system 100 can include a network 110. The network 110 allows communication between the components of the network-probability recommendation system 100. The network 110 can be, for example, a local area network (LAN), a wide area network (WAN), a wired network, wireless network, a telephone network such as, for example, a cellphone network, the Internet, the World Wide Web, or any other desired network. In some embodiments, the network 110 can use any desired communication and/or network protocols.

Figure 1A:
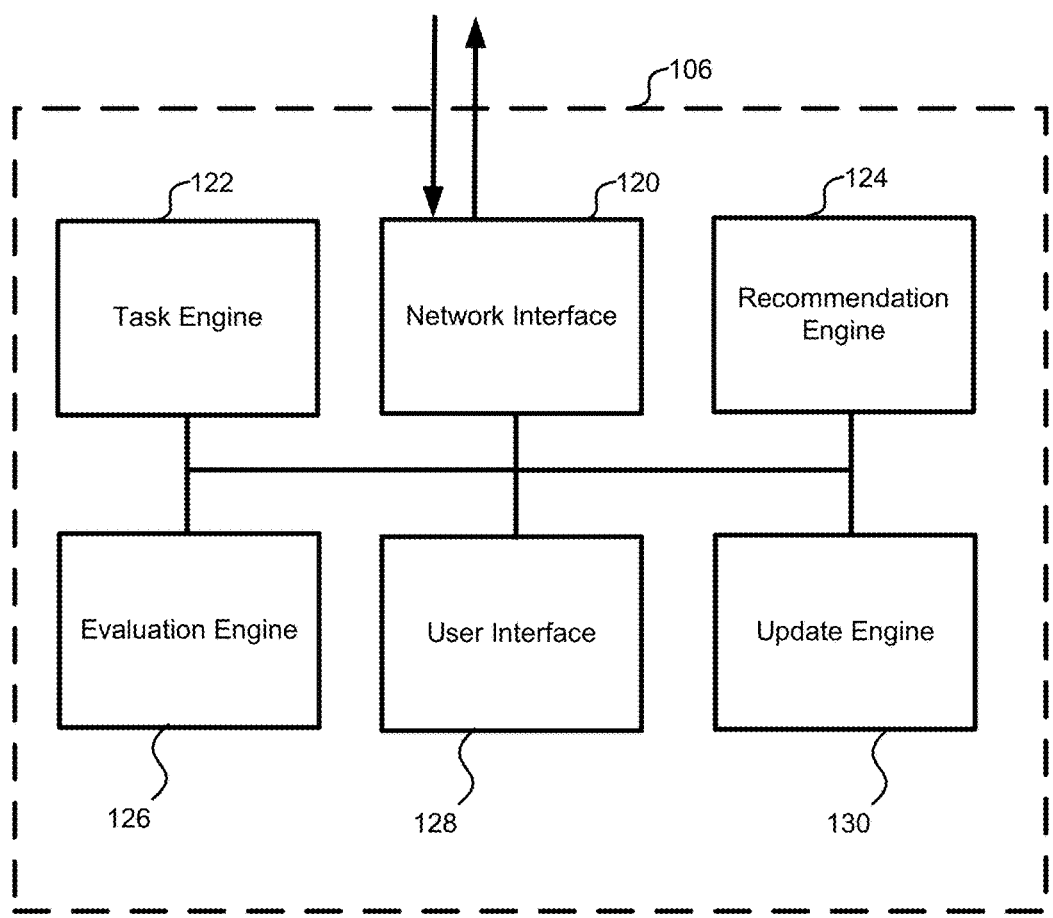
FIG. 1A depicts a schematic illustration of an embodiment of a user device.

With reference now to FIG. 1A, a block diagram of one embodiment of the user device 106 is shown. As discussed above, the user device 106 can be configured to provide information to and/or receive information from other components of the network-probability recommendation system 100. The user device can access the network-probability recommendation system 100 via any desired means or technology, including, for example, a webpage such as, for example, a social network service page, or a web portal. As depicted in FIG. 1A, the user device 106 can include a network interface 120. The network interface 120 allows the user device 106 to access the other components of the network-probability recommendation system 100, and specifically allows the user device 106 to access the network 110 of the network-probability recommendation system 100. The network interface 120 can include features configured to send and receive information, including, for example, an antenna, a modem, a transmitter, receiver, or any other feature that can send and receive information. The network interface 120 can communicate via telephone, cable, fiber-optic, or any other wired communication network. In some embodiments, the network interface 120 can communicate via cellular networks, WLAN networks, or any other wireless network.

The user device 106 can include, for example, a task engine 122. The task engine 122 can receive location data from the network database 104-A of the network-probability recommendation system 100 and can use this location information to retrieve one or several tasks from the node database 104-B. The task engine can also retrieve task data from the node database 104-B of the evaluation and rectification system 100, and can provide the task to the user/student. In some embodiments, for example, the task engine 122 can include features configured to allow the user to interact with and/or consume the task such as, for example, a video player, an audio player, word processing software, presentation software, and/or any other software used to provide the task to the user.

The user device 106 can include a recommendation engine 124. The recommendation engine 124 receives data from the databases 104 and can use that data to generate a recommendation for the user. In some embodiments, this recommendation can include a recommended next node for the user to proceed to, and/or a recommended node and next task for the user to proceed to. The next node can, in some embodiments, correspond to the node to which the user is recommended to proceed to, and the next task can correspond to the task to which the user is recommended to proceed to. In some embodiments, the recommendation engine 124 can use information from the network database 104-A, the node database 104-B, and/or the student database 104-C to calculate the likelihood that the user, in this case a student, will successfully complete a new node. This information can include information regarding the location of the user in the prerequisite graph including completed nodes and/or completed tasks, and/or any other information stored in the databases 104.

In some embodiments in which this likelihood is calculated for multiple nodes, the node having the highest likelihood of success can be selected and recommended to the user. In some embodiments, the calculated likelihood of success and/or the likelihood of success of the node with the highest likelihood of success can be compared to a recommendation threshold. If the likelihood of success of the node meets and/or exceeds the recommendation threshold, then the recommendation engine 124 can recommend advancing to that node. If the likelihood of success of the node does not meet and/or exceed the recommendation threshold, then the recommendation engine can recommend one or several tasks at the current node and/or at another completed node that, upon completion, will increase the likelihood of success sufficiently to allow the user to advance to the next node.

The user device 106 can include an evaluation engine 126. The evaluation engine 126 can receive user inputs provided as part of one or several tasks, and determine the correctness and/or incorrectness of those inputs. In some embodiments, for example, the evaluation engine 126 can receive answer data to questions asked as part of one or several tasks. This answer data can then be used by the evaluation engine 126 to correct answers provided by the student in response to task questions, and to provide the student with an evaluation of the task outcome. In some embodiments, for example, the evaluation engine 126 can be configured to provide information relating to the evaluation of the mission outcome to the network interface 120, which provides the information relating to the evaluation of the task outcome to the other components of the network-probability recommendation system 100, and specifically to the student database 104-C.

The user device 106 can include a user interface 202 that communicates information to, and receives inputs from a user. The user interface 128 can include a screen, a speaker, a monitor, a keyboard, a microphone, a mouse, a touchpad, a keypad, or any other feature or features that can receive inputs from a user and provide information to a user.

The user device 106 can include an update engine 130. The update engine can be used, for example, by an administrator to update a portion of the network-probability recommendation system 100, and specifically to provide maintenance to the network-probability recommendation system 100 and/or to update all or portions of the network database 104-A and/or the node database 104-B including, for example, the updating of one or several of the tasks associated with one or several of the nodes, or updating the interrelationship between nodes.

Figure 2:
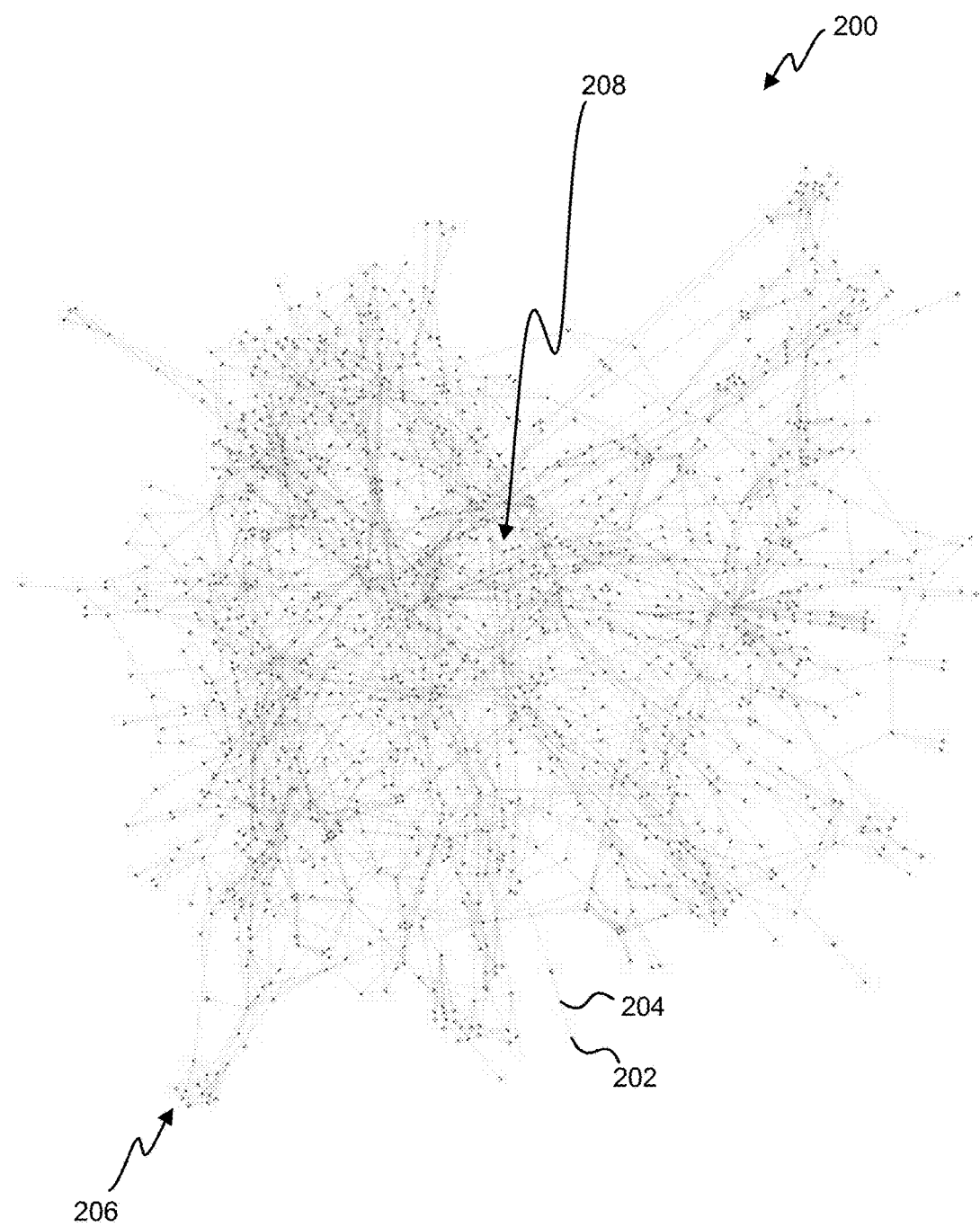
FIG. 2 depicts a schematic illustration of an embodiment of a prerequisite graph.

With reference now to FIG. 2, a schematic illustration of one embodiment of a prerequisite graph 200 is shown. In one embodiment, the prerequisite graph 200 can comprise a directed acrylic graph. In some embodiments, the prerequisite graph 200 can comprise data stored in a database.

The prerequisite graph 200 includes a plurality of nodes 202, also referred to herein as leaf nodes. In some embodiments, the nodes 202 of the prerequisite graph 200 represent an educational topic, or learning objective, and in some embodiments the nodes 202 of the prerequisite graph 200 each represent a unique educational topic, or learning objective. The learning objective can be any desired learning objective. In some embodiments, for example, one or several of the learning objects within in the prerequisite graph 200 can be unique to the network-probability recommendation system 100, and in some embodiments, the learning objective can be non-unique to the network-probability recommendation system 100. In one embodiment, for example, the learning objectives can correspond to objective identified within one or several curricula, standards, and/or programs including, for example, the Common Core standard.

The nodes 202 are linked together by connections 204. In the embodiment depicted in FIG. 2, the connections 204 represent a prerequisite relationship between the two directly connected nodes. In this relationship, one of the two directly connected nodes is a prerequisite to the other of the two directly connected nodes in that the subject matter of the prerequisite node is used in the completion of the other of the two directly connected nodes. As further seen in FIG. 2, the nodes 202 of the prerequisite graph 200 are linked together by connections 204 such that the nodes 202 are either directly linked, in that they are linked by one connection 204, or indirectly linked, in that they are linked by a plurality of connections 204 and at least one intermediate node 202, with each other.

As further seen in FIG. 2, the prerequisite graph 200 includes a perimeter portion 206 and a center portion 208. In some embodiments, for example, nodes 202 located at the perimeter portion 206 of the prerequisite graph 200 can comprise starting points for the material encompassed by the prerequisite graph 200 in that nodes 202 located at the perimeter portion 206 of the prerequisite graph 200 do not have prerequisites. In some embodiments, the center portion 208 of the prerequisite graph 200 can include nodes 202 that have a prerequisite node. In some embodiments, for example, as nodes located at the center portion 208 of the prerequisite graph 200 have prerequisites, nodes located at the center portion 207 of the prerequisite graph 200 are therefore not normal starting points unless the user indicates mastery of the prerequisite material via, for example, an intake problem, questionnaire, and/or exam, or if mastery is inferred for the user.

Figure 3:
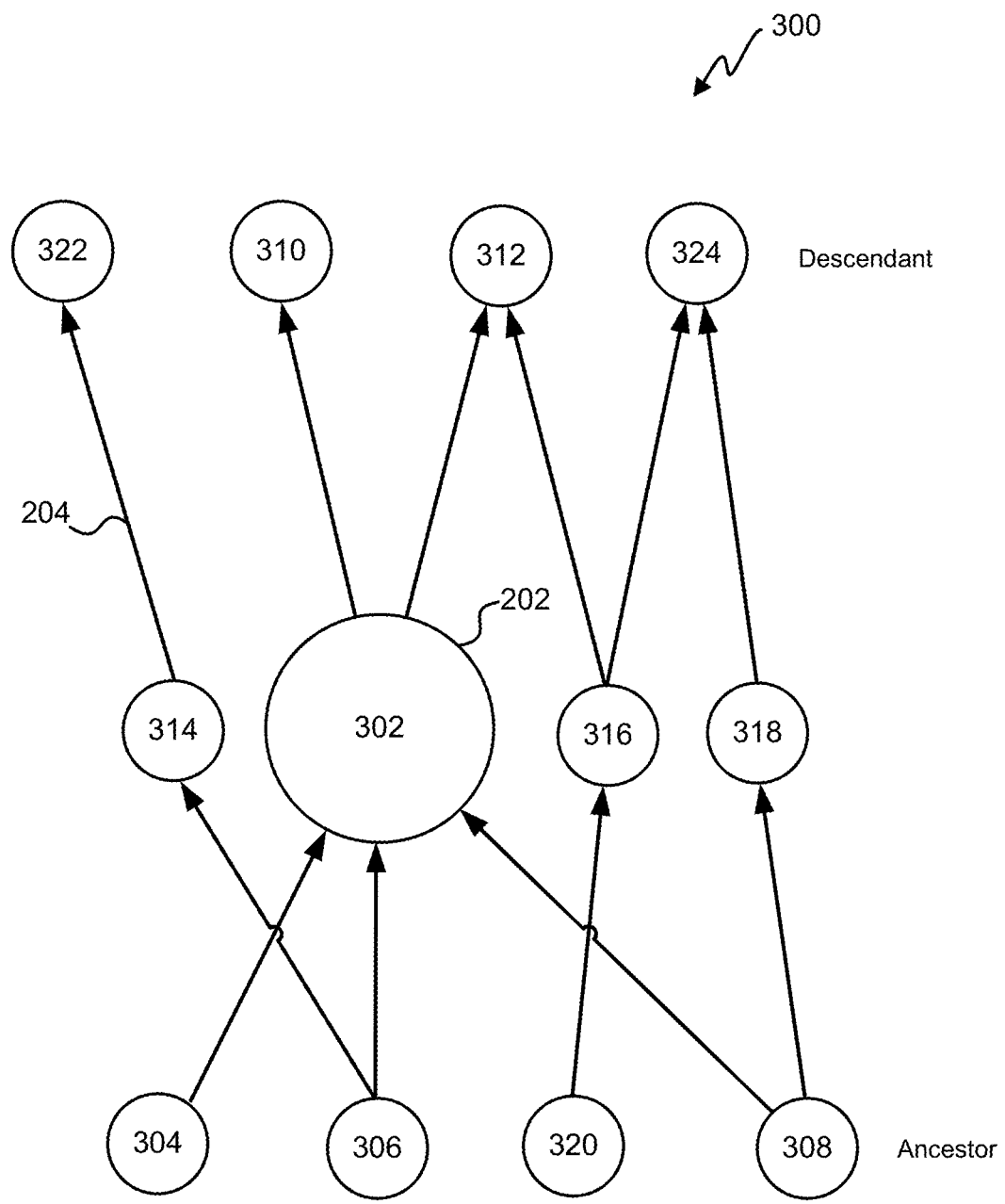
FIG. 3 depicts a schematic illustration of a portion of an embodiment of the prerequisite graph.

With reference now to FIG. 3, a schematic illustration of one embodiment of a portion 300 of the prerequisite graph 200 is shown. Similar to the prerequisite graph 200 shown FIG. 2, the portion 300 of the prerequisite graph 200 shown in FIG. 3 includes a plurality of nodes 202, each uniquely labeled, and connections 204. In contrast to the depiction of the prerequisite graph 200 shown in FIG. 2, the connections 204 of portion 300 of prerequisite graph 200 shown in FIG. 3 include a directional indicator indicating the prerequisite relationship between the nodes 202. Thus a node located at the tail of the arrow of the connector 204 is prerequisite to a node located at the head of the arrow of the connector 204.

In some embodiments, nodes 202 can be connected via different pathways, and the connection and relationship of the nodes 202 can be defined in terms of familial relationships. Thus, a node 202 can have ancestor nodes and/or descendent nodes. With reference to FIG. 3 an initial node 302 is shown that has both ancestor and descendent nodes. The initial node 302 has three parent nodes 304, 306, 308 (ancestor nodes) and two child nodes 310, 312 (descendant nodes). As seen in FIG. 3, parent nodes 304, 306, 308 are parents to initial node 302 in that parent nodes 304, 306, 308 are prerequisites to the initial node 302. Similarly, and as seen in FIG. 3, child nodes 310, 312 are children to the initial node 302 in that initial node 302 is a prerequisite to child nodes 310, 312.

As further seen in FIG. 3, the parent nodes 306, 308 of the initial node 302 have children (nodes 314, 318) other than the initial node 302, and the child node 312 has a parent node (node 316) other than the initial node 302. Further, nodes 314, 316, 318 have child nodes 322, 324 that are not children of the initial node 302.

In some embodiments, nodes 202 of the prerequisite graph 200 are selected for inclusion in determining a recommended next node. This selection of nodes 202 and/or of the portion 300 of the prerequisite graph 200 can be determined by a bounding rule, also referred to herein as a boundary rule, that defines the type and degree of association required for a node 202 to be included by the bounding rule. In some embodiments, the bounding rule can comprise a single rule applicable to some or all of the nodes 202 of the prerequisite graph 200. In one embodiment, for example, the bounding rule may comprise a first rule applicable to descendent nodes of the initial node 302 and a second rule applicable to ancestor nodes of the initial node 302. In some embodiments, the bounding rule may include multiple generations of descendent nodes and/or multiple generations of ancestor nodes.

In some embodiments, the selection of nodes 202 from the prerequisite graph 200 can entail selecting a portion 300 of the prerequisite graph 200. The portion 300 of the prerequisite graph 200 and/or the nodes 202 of the prerequisite graph 200 can be selected using a variety of different techniques. In some embodiments, the nodes 202 and/or portion 300 of the prerequisite graph 200 are selected based on their relationship with the initial node 302. In one embodiment, for example, the selected nodes and/or portion 300 of the prerequisite graph 200 include only direct children (in the embodiment shown in FIG. 3, child nodes 310, 312) and direct parents (in the embodiment shown in FIG. 3, parent nodes 304, 306, 308) of the initial node 302. In one embodiment, for example, the selected nodes and/or portion 300 of the prerequisite graph can be defined by the Markov blanket which can include, for example, the direct children (in the embodiment shown in FIG. 3, child nodes 310, 312) of the initial node 302, the direct parents (in the embodiment shown in FIG. 3, parent nodes 304, 306, 308) of the initial node 302, and any children of the direct parents of the initial node 302 (in the embodiment shown in FIG. 3, nodes 314, 318).

Figure 4:
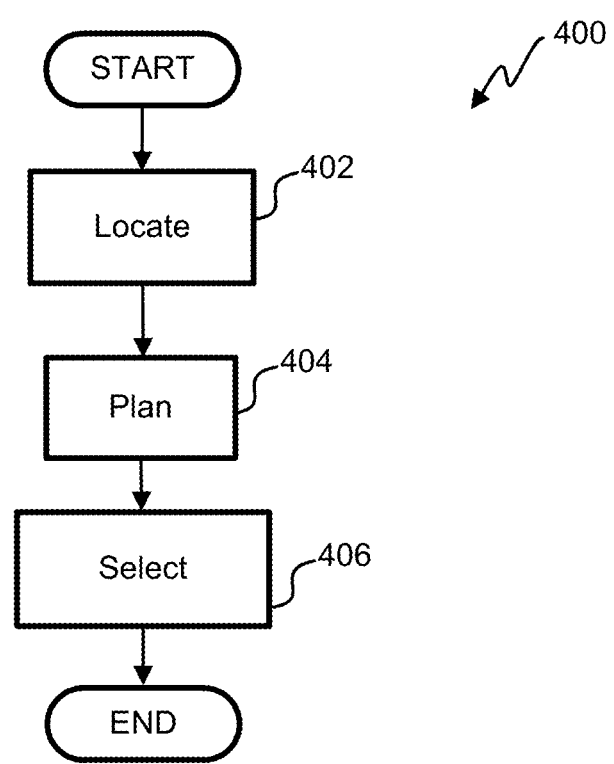
FIG. 4 illustrates a flowchart of an embodiment of a process for generating a recommendation.

With reference now to FIG. 4, a flowchart illustrating one embodiment of a process 400 for generating a recommendation is shown. In some embodiments, the process 400 can be performed by the network-probability recommendation system 100 and/or one or several of the components thereof.

The process 400 begins at block 402 wherein the node of the prerequisite graph 200 at which the user is currently located is determined and wherein the next node for the user is determined. In some embodiments, for example, this determination can include retrieving the prerequisite graph 200, retrieving information relating the individual nodes 202 and the prerequisite graph 200, and retrieving information relating to the user's interaction with the prerequisite graph 200, and specifically with the nodes 202 of the prerequisite graph 200. In some embodiments, for example, the node at which the user is currently located can be a node 202 that the user has satisfactorily completed, has unsatisfactorily completed, or has not completed, and can correspond to the initial node 302 of FIG. 3.

After information relating to the prerequisite graph 200, the nodes 202 of the prerequisite graph 200, and the user has been collected, the next node can be determined. This determination of the next node can be based on the likelihood of user success in completing and/or mastering the next node, and particularly the likelihood of a student passing and/or demonstrating desired proficiency in the subject matter associated with the next node. This calculation can be performed using a variety of functions and/or techniques. In one specific embodiment, the determination of the likelihood of the user success at the next node can be determined by calculation of conditional probabilities, which can be based on past user actions and past performance of the user. In one specific embodiment, a probabilistic model such as, for example, a Bayesian Network/model, can be used to determine the likelihood of user success. In some embodiments, In some embodiments, this next node can be the same as the current node and/or different than the current node.

After the node at which the user is currently located and next node have been determined, the process 400 proceeds to block 404 wherein the user's next task is planned. In some embodiments, for example, each node 202 can contain several tasks, and in some embodiments, these task can be organized according to several categories. In one specific embodiment, for example, a node 202 can include one or several learning activities, one or several practice activities, and/or one or several challenge activities. In some embodiments, for example, the completion of the node 202 can be achieved by completing one or some of each of a learning activity, practice activity, and a challenge activities.

In some embodiments, for example, the different activities within the node 202 can focus on different aspects of the educational object associated with the node 202. Thus, in some embodiments, one or several of the activities may comprehensively address all of the subject matter of the node 202 and one or several of the activities may address specific aspects and/or components of the learning object associated with the node 202. Advantageously this difference in the scope of the activities can allow for an initial recommendation of the task and/or activity that broadly covers subject matter of the entire node 202 when a user first begins work with the node 202, and later can allow for recommendation of the task and/or activity that addresses a specific topic and/or aspect of the node 202 with which the user is having difficulties or to which would like additional exposure. Thus, this difference in the scope of the activities associated with the node 202 can allow tailored and specific recommendations to thereby speed the learning process and to facilitate the advancement of the user.

In some embodiments, the user may be advanced to different categories of activities in a node 202 according to a predetermined pattern. Thus, in one embodiment, a user may first receive a recommendation for and/or receive a learning activity, followed by a practice activity, and then a challenge activity. In such an embodiment, and in the event that the user does not demonstrate sufficient mastery of the subject matter of the node 202 to advance, the user may again receive a recommendation for a learning activity, and then continue to cycle through the different categories of activities until a sufficient level of mastery of the subject matter of the node 202 is demonstrated. Similarly, in the event that the user demonstrates a weakness with a specific aspect of the subject matter of the node 202, a learning activity, followed by a practice activity, and then by a challenge activity focused on the demonstrated weakness of the user can be recommended and/or provided.

After the user's next task has been planned, the process 400 proceeds to block 406 wherein the next node and task are selected. In some embodiments, this can include the selection of content to be delivered, which selection can be made according to business rules, or based on, for example, user/community profiling information. In some embodiments, for example, the selection can be made by the user in response to prompts received from the network-probability recommendation system 100 via, for example, the user device 106. In some embodiments, for example, the selection can be made by the network-probability recommendation system 100 based on other considerations such as, for example, considerations as to the source of the next node and/or next activity, the relationship with the source of the next node and/or next activity, and/or any stored user preferences.

Figure 5:
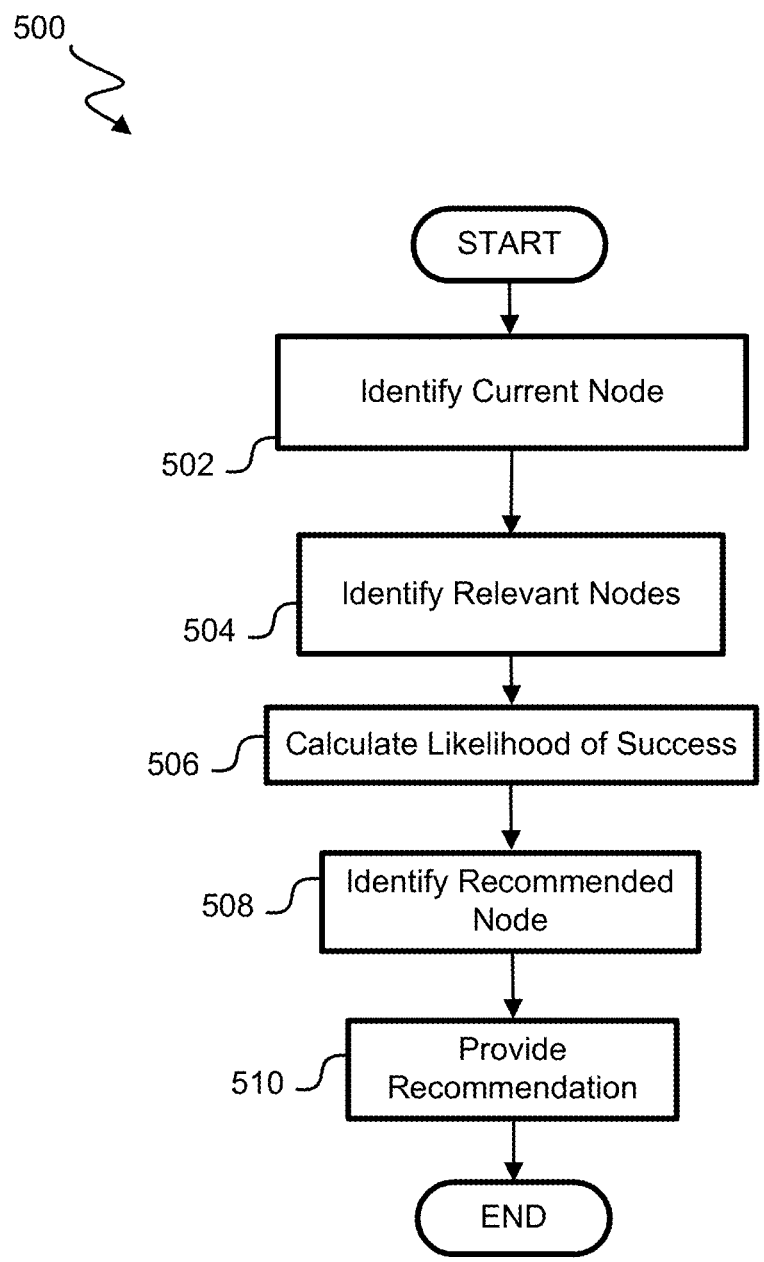
FIG. 5 illustrates a flowchart of an embodiment of a process for generating a network-probability recommendation.

With reference now to FIG. 5, one embodiment of a process 500 for generating a network-probability recommendation is shown. This process can be performed by the network-probability recommendation system 100 and/or components thereof.

The process 500 begins at block 502 wherein the initial node 302 is identified. In some embodiments, for example, the initial node 302 can be identified by the network-probability recommendation system 100 and/or component thereof. In one specific embodiment, for example, the initial node 302 can be identified by the recommendation engine 124 of the user device 106, and specifically of the student device 106-A.

After the current node has been identified, the process 500 proceeds to block 504 wherein the relevant nodes are identified. In some embodiments, for example, this can include the retrieval of rules specifying the categorization of nodes as irrelevant and/or irrelevant and sorting the nodes according to this rule. In some embodiments, this is performed by the recommendation engine 124 of the user device 106, and specifically by student device 106-A with information received from the databases 104, and specifically from the node database 104-B and threshold database 104-D.

After the relevant nodes have been identified, the process 500 proceeds to block 506 wherein the likelihood of success is calculated. In some embodiments, for example, the likelihood of success can correspond to the likelihood of the user completing, passing, and/or mastering subject matter associated with next node. In some embodiments, for example, this can include retrieving information relating to the user interaction with one or several nodes 202 including, for example, verification of which nodes 202 the user has completed, which tasks the user has completed, time that the user has spent on one or several of the nodes 202 and/or one or several the tasks within the nodes 202, scores that the user has received in completing one or several the nodes 202 and/or one or several tasks associated with the nodes 202, and/or any other desired information. In some embodiments, for example, this information is received by the recommendation engine 124 of the user device 106 such as, for example, the student device 106-A, and is then used in calculating conditional probabilities such as, for example, according to the Bayesian Network/model.

After the likelihood of success has been calculated, the process 500 proceeds to block 508 wherein the recommended node is identified. In some embodiments in which the likelihood of success is calculated for multiple nodes 202, this step can include comparison of the calculated likelihood success to determine which node 202 has the highest likelihood of success. In some embodiments in which likelihood of success is calculated from a single node 202 and/or in which the node 202 having the highest likelihood of success has been selected, the identification of the recommended node can include determining whether the calculated likelihood of success is sufficiently high to meet and/or exceed recommendation thresholds. In some embodiments, for example, this can include a comparison of the calculated likelihood of success for a node 202 with a threshold value and associating a value such as, for example, a Boolean value, indicative of whether the recommendation threshold is met and/or exceeded with that node 202. In some embodiments, in which the calculated likelihood of success associated with the node 202 does not meet and/or exceed the recommendation threshold, the recommended node can comprise, for example, the current node and/or other completed node which can be selected to have maximum positive impact in increasing the previously deficient likelihood of success. In some embodiments, this determination can be made by recommendation engine 124 of the user device 106, and specifically of the student device 106-A.

After the recommended node has been identified, the process 500 proceeds to block 510 wherein the recommendation is provided. In some embodiments, for example, providing the recommendation can include providing the user with an indication of the recommended node and/or the recommended task. In some embodiments, for example, this recommendation can be provided to the user via the user device 106, and specifically via the student device 106-A. In one specific embodiment, for example, this recommendation is provided to the user via the user interface 128 of the student device 106-A.

Figure 6:
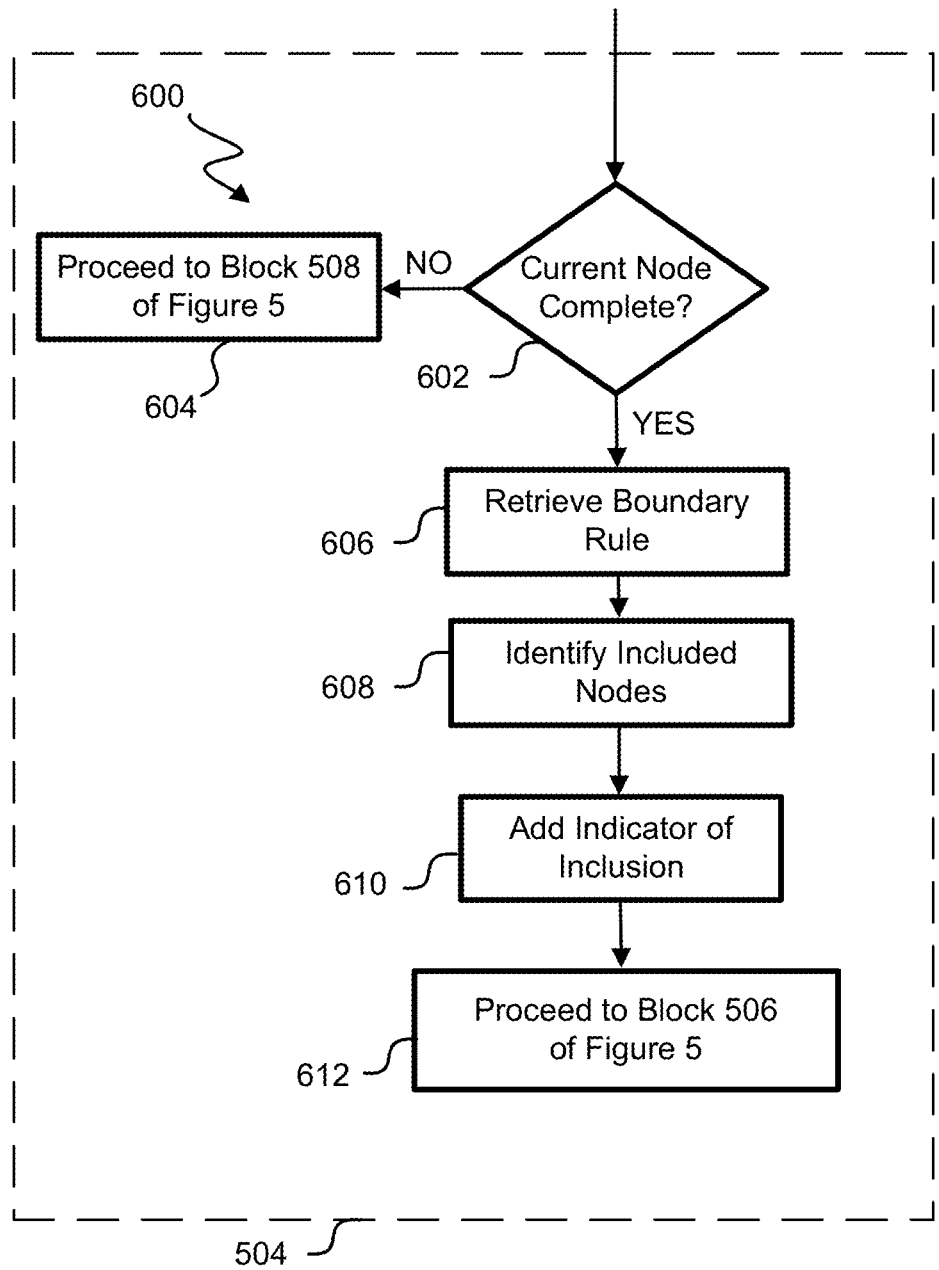
FIG. 6 illustrates a flowchart of an embodiment of a process for identifying relevant nodes.

With reference to FIG. 6, one embodiment of a process 600 for identifying relevant nodes is shown. In some embodiments, the process 600 can be performed in the place of block 504 of FIG. 5. The process 600 can be performed by the network-probability recommendation system 100 and/or a component thereof.

The process 600 begins at decision state 602 wherein it is determined if the current node is complete. In some embodiments, for example, this determination can be made by one or both of the recommendation engine 124 and the evaluation engine 126 of the user device 106. In some embodiments, for example, this determination can include querying the node database 104-B and the student database 104-C for information relating to one or several tasks associated with the node and user activity associated with the node. In some embodiments, for example, an indicator of the completion of a node can be added to one or both of the node database 104-B and the student database 104-C, which indicator can be used to determine whether the current node has been completed by the user. If the current node has not been completed, the process 600 proceeds to block 604 and proceeds to block 508 of FIG. 5.

If the current node has been completed, process 600 proceeds to block 606 wherein the boundary rule is retrieved. In some embodiments, for example, the boundary rule can define the number of nodes 202 and/or the size the portion 300 of the prerequisite graph 200 that is used in calculating the likelihood of success and in determining the next node. As discussed above, the bounding rule can comprise a single rule applicable to some and/or all of the nodes 202 in the prerequisite graph 200 and/or a plurality of rules applicable to different subsets of nodes 202 of the prerequisite graph 200. In one embodiment, for example, the bounding rule can comprise a first rule applicable to ancestor nodes and a second rule applicable to descendent nodes.

The bounding rule can be retrieved, for example, from one of the databases 104, and specifically from the network database 104-A, the node database 104-B, and/or the threshold database 104-D. In some embodiments, the bounding rule can be provided to, for example, the recommendation engine 124 of the user device 106.

After the boundary rule has been received, the process 600 proceeds to block 608 wherein included nodes are identified. In some embodiments, the identification of the included nodes can include the application the bounding rule to the prerequisite graph 200. In some embodiments, the application of the bounding rule to the prerequisite graph 200 can be performed by the user device 106, and specifically by the recommendation engine 124 of the user device 106.

After the included nodes have been identified, the process 600 proceeds to block 610 wherein an indicator of inclusion is added. In some embodiments, for example, an indicator can be associated with the node 202 to indicate whether the node 202 is included by the bounding rule. In some embodiments, this indicator can be stored in one of the databases 104 such as, for example, the node database 104-B and/or the student database 104-C. This indicator can then be retrieved and used in sorting relevant and irrelevant nodes to facilitate the determination of a recommended next node. After the indicator of inclusion has been added, the process 600 proceeds to block 612 and returns to block 506 of FIG. 5.

Figure 7:
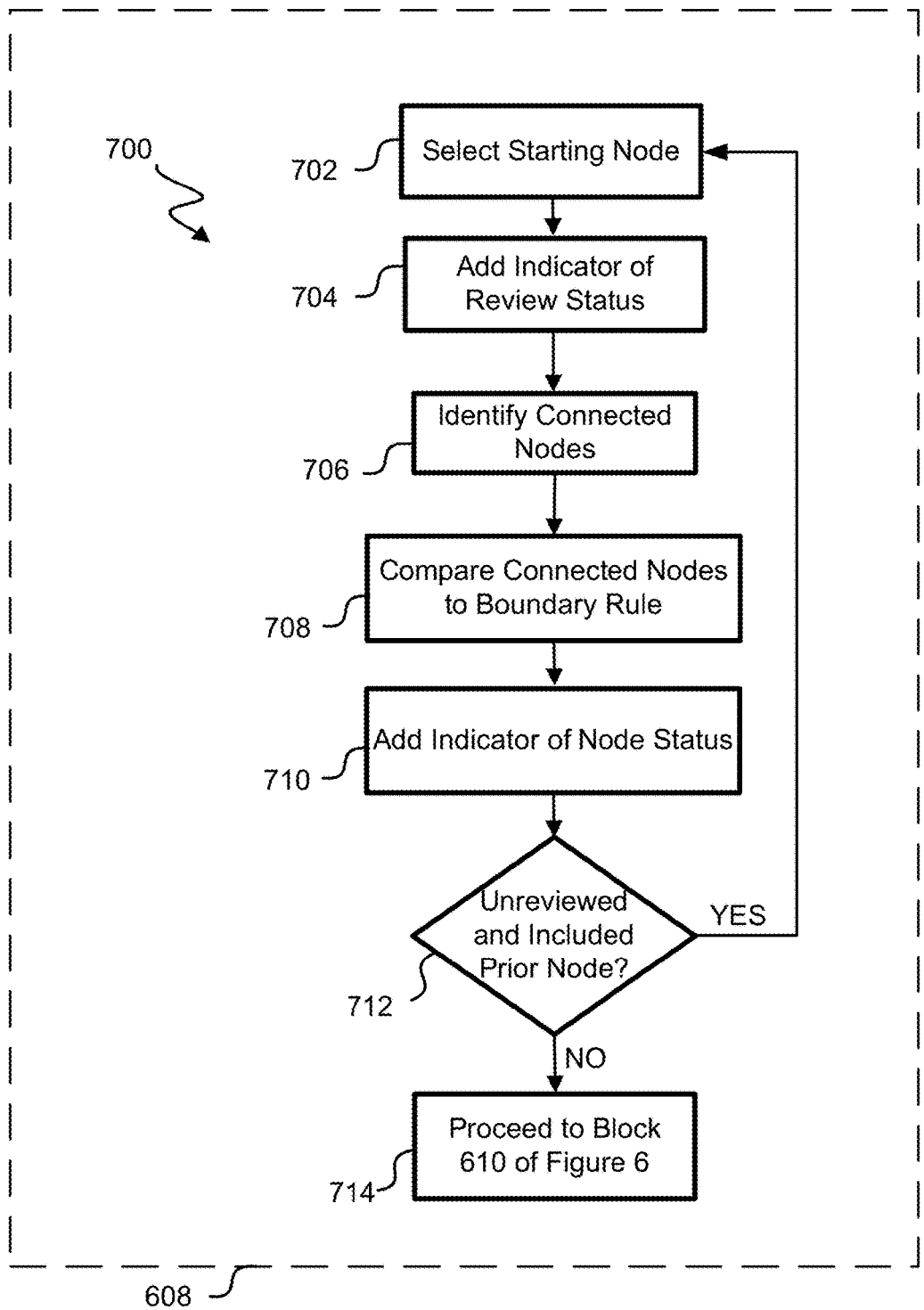
FIG. 7 illustrates a flowchart of an embodiment of a process for identifying included nodes.

With reference now to FIG. 7, a flowchart illustrating one embodiment of a process 700 for identifying included nodes is shown. In some embodiments, for example, this process 700 can be performed as part or all of block 608 shown in the FIG. 6. The process 700 can be performed by the network-probability recommendation system 100 and/or a component thereof.

The process 600 begins at block 702, wherein a starting node is selected. In some embodiments, for example, the starting node can be the node 202 corresponding to the initial node 302 of the user within the prerequisite graph 200, and in some embodiments, the starting node can be a node 202 other than the initial node 302 of the user within the prerequisite graph 200. In some embodiments, the starting node can be selected by, for example, the recommendation engine 124 of the user device 106, and in some embodiments, the starting node can be selected based on information retrieved from one of the databases 104 such as, for example, the student database 104-C.

After the starting node has been selected, the process 700 proceeds to block 704 wherein an indicator of the review status is associated with the starting node. In some embodiments, for example, this indicates that a node 202 has been reviewed and/or indicates that a node 202 has not been reviewed. In some embodiments, for example, the indicator of the review status can be stored in one of the databases 104, and specifically in the node database 104-B and/or the student database 104-C.

After the indicator of review status has been added, the process 700 proceeds to block 706 wherein nodes 202 directly connected with the selected starting node are identified. In some embodiments, for example, this can include determining one or both of ancestor and descendent nodes of the selected starting node.

Connectivity data for the nodes can be associated with the nodes 202 in different ways. In one embodiment, for example, connectivity data identifying one or several generations of ancestor nodes and/or descendent nodes can be associated with a node 202. In some embodiments, for example, connectivity data can be associated with each node 202 in the prerequisite graph 200, and in some embodiments, connectivity data can be associated with some of the nodes 202 in the prerequisite graph 200.

After the connected nodes 202 have been identified, the process 700 proceeds to block 708 wherein the nodes 202 connected with the starting node are compared to the boundary rule. In some embodiments, for example, this comparison can include the comparison of the relationship of the connected nodes with the initial node 302, which can, as discussed above, be the same node 202 as the selected starting node and/or a different node 202 than the selected starting node. In some embodiments, the comparison of the connected nodes to the boundary rule can be performed by the recommendation engine 124 of the user device 106.

After the connected nodes are compared to the boundary rule, the process 700 proceeds to block 710 wherein an indicator of node status is added. In some embodiments, this indicator of node status can indicate whether a specific connected node is included within the boundary rule. In some embodiments, this indicator can be added by the recommendation engine 124 of the user device 106 and can be stored in one of the databases 104 such as, for example, the node database 104-B and/or the student database 104-C.

After the indicator of node status as been added, the process 700 proceeds to decision state 712 wherein it is determined if there are additional included and unreviewed nodes 202. In some embodiments, this step can include the determination of whether there are any additional included nodes 202, and in some embodiments this can include the determination of whether there are any additional unreviewed nodes 202. This determination can be made, for example, by the recommendation engine 124 of the user device 106 after retrieving node status from one or several of the databases 104. If it is determined that there are additional included nodes 202, then the process 700 returns to block 702.

Returning again to decision state 712, if it is determined that there are no additional included nodes, then the process 700 proceeds to block 714 and returns to block 610 of FIG. 6.

Figure 8:
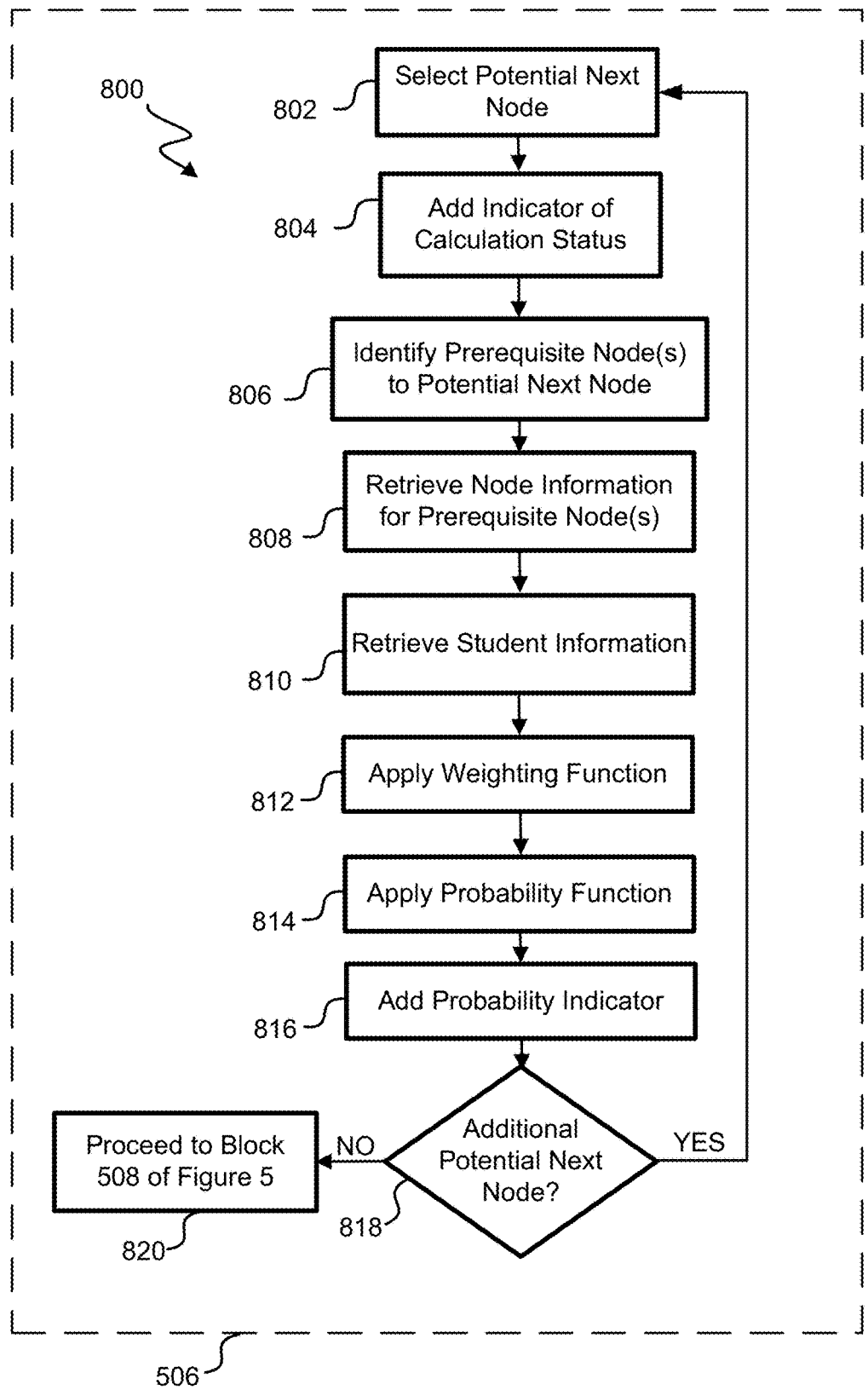
FIG. 8 illustrates a flowchart of an embodiment of a process for calculating a user's likelihood of success in completing a next node.

With reference now to FIG. 8, a flowchart illustrating one embodiment of a process 800 for calculating the likelihood of user success at a potential next node is shown. In some embodiments, this process 600 can be performed as part or all of block 506 of FIG. 5. The process 800 can be performed by the network-probability recommendation system 100 and/or one or several components thereof.

The process 800 begins at block 802 wherein a potential next node is selected. In some embodiments, for example, the potential next node can comprise one of the current node, a completed node, and an uncompleted node. In one embodiment, the potential next node is an uncompleted node 202 that is directly connected to the initial node 302. In some embodiments, the potential next node can be selected from nodes 202 included within the boundary rule. In one embodiment, for example, these nodes 202 can be selected by retrieving information identifying the nodes 202 included within the boundary rule and by retrieving information identifying uncompleted nodes 202. In some embodiments, this information can be retrieved by recommendation engine 124 of the user device 106 from one or several of the databases 104, and the recommendation engine 124 of the user device 106 can evaluate the retrieved data to identify potential next nodes.

After the potential next node has been identified, the process 800 proceeds to block 804 wherein an indicator of calculation status is associated with the potential next node. In some embodiments, for example, the indicator of calculation status indicates whether the likelihood of success has or has not been calculated for the potential next node. In some embodiments, for example, this indicator can be added to one of the databases 104 such as, for example, the network database 104-A, the node database 104-B, and/or the student database 104-C.

After the indicator of calculation status has been added, the process 800 proceeds to block 806 wherein prerequisite nodes to the potential next node are identified. In some embodiments, for example, this can include determining ancestor nodes that are directly connected to the potential next node and/or ancestor nodes that are indirectly connected to the potential next node. In some embodiments, this identification can be performed by retrieving data relating to the interconnectivity of the nodes 202 from one of the databases 104, and specifically from the network database 104-A and/or the node database 104-B.

After any prerequisite nodes to the potential next node have been identified, the process 800 proceeds to block 808 wherein node information for the prerequisite nodes is retrieved. In some embodiments, for example, this information can identify the subject matter embodied by the node 202 and/or the tasks included in the node 202. This information can be retrieved, for example, from one of the databases 104 such as, for example, the node database 104-B.

After the node information for the prerequisite nodes has been retrieved, the process 800 proceeds to block 810 wherein student information is retrieved. In some embodiments, the student information can be any information used to calculate the likelihood of success of the user, which can be the student, of completing the potential next node. In some embodiments, for example, this information can include information relating to the user's interactions with any prerequisite nodes of the potential next node including, for example, which nodes and/or tasks have been completed by the user, how much time the user has spent on one or several nodes and/or tasks, one or several scores received by the user in completing one or several nodes and/or tasks, data relating to user performance including, for example, the user's past success rate in completing nodes, and/or any other desired information. In some embodiments, this information can be retrieved, for example, from one of the databases 104 such as the student database 104-C.

After the student information has been retrieved, the process 800 proceeds to block 812 wherein a weighting function is applied. In some embodiments, for example, the weighting function can be configured to adjust, compensate, and/or normalize the gathered data to allow use of the gathered data in calculating the likelihood of success. In some embodiments, this can be performed by the recommendation engine 124 of the user device 106.

After the weighting function has been applied, the process 800 proceeds to block 814 wherein a probability function is applied. In some embodiments, the probability function can be applied to the collected and/or weighted data to determine the likelihood of user success in completing the potential next node. In one embodiment, for example, this probability can be calculated according to a Bayesian Network/model. This calculation can be performed by the recommendation engine 124 of the user device 106.

After the probability function has been applied, the process 800 proceeds to block 816 wherein a probability indicator is added. In some embodiments, for example, the probability indicator can indicate the result of the application of the probability function and can indicate, for example, the user's likelihood of success in completing the potential next node. In some embodiments, for example, this indicator can be added by the recommendation engine 124 of the user device 106 and can be stored in one of the databases 104 such as, for example, the node database 104-B, and/or student database 104-C.

After the probability indicator has been added, the process 800 proceeds to decision state 818, wherein it is determined if there is an additional potential next node. In some embodiments, for example, this can include evaluating the subset of potential next nodes to determine whether a likelihood of success has not been calculated for any of the potential next nodes. This evaluation can include determining which of the potential next nodes do not include an indicator of calculation status that indicates that the likelihood of success has been calculated. This determination can be made, for example, by the processor 102 and/or by the recommendation engine 124 of the user device 106. If it is determined that there are additional potential next nodes, then the process 800 returns to block 802. If it is determined there are no additional potential next nodes, the process 800 proceeds to block 820, and then proceeds to block 508 of FIG. 5.

Figure 9:
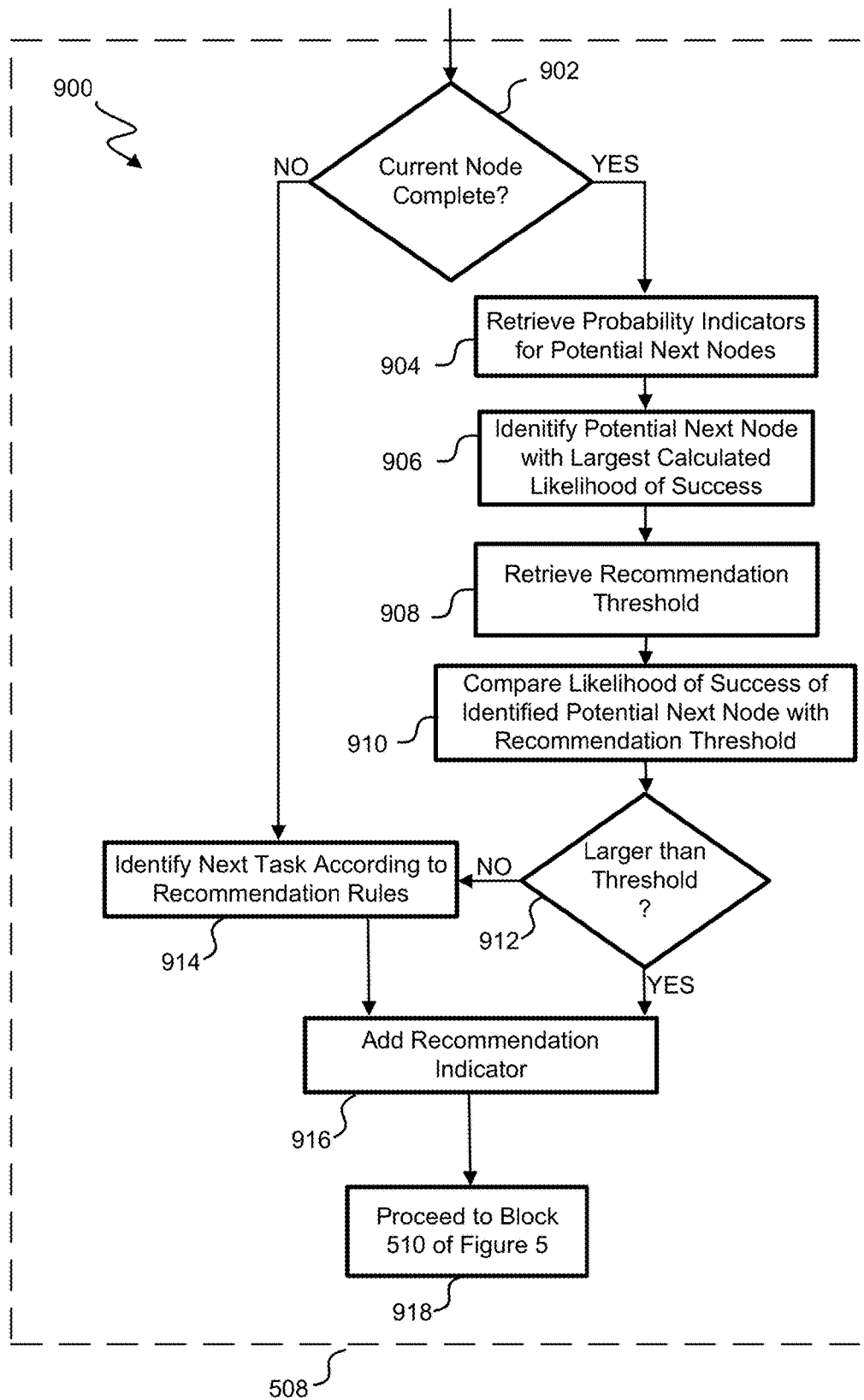
FIG. 9 illustrates a flowchart of an embodiment of a process for identifying a recommended next node.

With reference now to FIG. 9, a flowchart illustrating one embodiment of a process 900 for identifying a recommended node is shown. This process 900 can be performed as part or all of block 508 depicted in FIG. 5. In some embodiments, this process 900 can be performed by the network-probability recommendation system 100 and/or by one or several components thereof.

The process 900 begins at decision state 902 wherein it is determined if the current node 302 is complete. In some embodiments, this determination can include retrieving information from the databases 104 including, for example, node information from the node database 104-B, and/or student information from the student database 104-C. In some embodiments, for example, information relating to the user's interactions with the initial node 302 including, for example, the number of tasks completed by the user, the scores received by the user uncompleted tasks, the amount of time spent by the user on the initial node 302 and/or tasks associated with the current node 302 and/or any other user information can be used to determine whether the current node 302 is complete. In some embodiments, this determination can be made by components of the user device 106 including, for example, one or several of the task engine 122, the recommendation engine 124, and the evaluation engine 126.

If it is determined that the current node is complete, then the process 900 proceeds to block 904 wherein probability indicators for potential next nodes are retrieved. In some embodiments, for example, this can include querying one or several of the databases 104 including, for example, the node database 104-B and/or the student database 104-C for probability indicators associated with potential next node.

After probability indicators associated with the potential next node have been retrieved, the process 900 proceeds to block 906 wherein the potential next node with the largest calculate likelihood of success is identified. In some embodiments, for example, this identification can be performed by comparing the likelihood of success for each of the potential next nodes to determine which of the potential next nodes has the highest likelihood of success. This comparison can be made by the recommendation engine 124 of the user device 106.

After the potential next node having the largest calculated likelihood of success has been identified, the process 900 proceeds to block 908 wherein the recommendation threshold is retrieved. In some embodiments, for example, the recommendation threshold can identify a threshold to be met and/or exceeded before a potential next node is recommended. The recommendation threshold can assist in assuring that a next node is not recommended when a user is unready for the next node, and therefore likely to not successfully complete the next node. In some embodiments, the recommendation threshold can be retrieved from one of the databases 104 and specifically from the threshold database 104-D.

After the recommendation threshold has been retrieved, the process 900 proceeds to block 910 wherein the likelihood of success of the next node having the highest likelihood of success is compared with the recommendation threshold. In some embodiments, this comparison can be performed according to a boolean function, and a first value can be assigned if the node having the highest likelihood of success meets the recommendation threshold, and a second value can be assigned if the node having the highest likelihood of success does not meet the recommendation threshold. In some embodiments, this comparison can be performed by recommendation engine 124 of the user device 106.

After the likelihood of success of the identified potential next node is compared with recommendation threshold, the process 900 proceeds to decision state 912 wherein it is determined if the likelihood of success the identified potential next node meets requirements of the recommendation threshold. In some embodiments, this determination can comprise retrieving the values assigned according to the boolean function and identifying the assigned value as either indicative of meeting the recommendation threshold, or as indicative of failing to meet the recommendation threshold. In some embodiments, this determination can be made by the recommendation engine 124 of the user device 106.

If the likelihood of success of the identified potential next node does not meet the requirements of the recommendation threshold, and, returning again to decision state 902 if the current node is not complete, then the process 900 proceeds to block 914 wherein a next task is identified according to recommendation rules. In some embodiments, this can include retrieving recommendation rules from threshold database 104-D, which rules can specify and/or provide guidance regarding the recommendation of one or several tasks. In some embodiments, for example, the recommendation rules can provide an order in which tasks are provided. This provided order can, for example, indicate providing tasks in the order of a learning activity, a practice activity, and the challenge activity.

In some embodiments, identifying the next task according to the recommendation rules can include determining the last task completed in the current node 302. Once the last completed task is identified, the recommendation rule can be applied to allow the determination of the next task. The application of recommendation rule, and the determination of the next task can be performed by a component of the user device 106 including, for example, the task engine 122, the recommendation engine 124, and/or the evaluation engine 126.

After the next task has been identified, and returning again to decision state 912 if the likelihood of success is larger than the recommendation threshold, then the process 900 proceeds to block 916 wherein a recommendation indicator is provided. In some embodiments, for example, the recommendation indicator can comprise data associated with the task and/or potential next node that indicates that the task and/or potential next node qualifies for recommendation. In some embodiments, while a task and/or potential next node qualifies for recommendation, the task and/or potential next node may not be recommended for other reasons including, for example, limits to a user's access, access to and/or costs associated with the task and/or of a node, and/or because of a request by, for example, an educator, supervisor, an administrator, and/or a parent that the specific user not advance. In some embodiments, the recommendation indicator can be added to one of the databases 104 including, for example, the node database 104-C and/or the student database 104-B. After the recommendation indicator has been added, the process 900 proceeds to block 918 and then proceeds to block 510 of FIG. 5.

Figure 10:
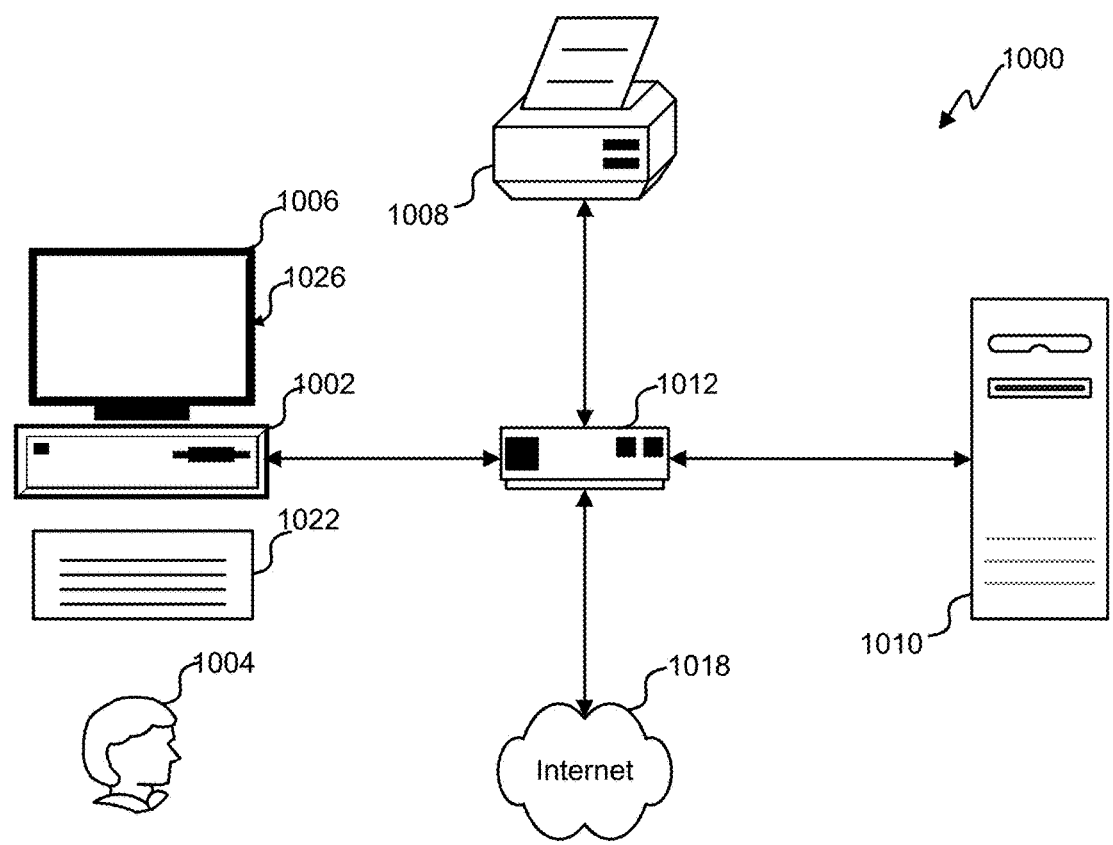
FIG. 10 depicts a block diagram of an embodiment of a computer system.

With reference now to FIG. 10, an exemplary environment with which embodiments may be implemented is shown with a computer system 1000 that can be used by a user 1004 as a component of the network-probability recommendation system 100. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. The monitor 1006 can be a CRT, flat screen, etc.

A user 1004 can input commands into the computer 1002 using various input devices, such as a mouse, keyboard 1022, track ball, touch screen, etc. If the computer system 1000 comprises a mainframe, a designer 1004 can access the computer 1002 using, for example, a terminal or terminal interface. Additionally, the computer system 1026 may be connected to a printer 1008 and a server 1010 using a network router 1012, which may connect to the Internet 1018 or a WAN.

The server 1010 may, for example, be used to store additional software programs and data. In one embodiment, software implementing the systems and methods described herein can be stored on a storage medium in the server 1010. Thus, the software can be run from the storage medium in the server 1010. In another embodiment, software implementing the systems and methods described herein can be stored on a storage medium in the computer 1002. Thus, the software can be run from the storage medium in the computer system 1026. Therefore, in this embodiment, the software can be used whether or not computer 1002 is connected to network router 1012. Printer 1008 may be connected directly to computer 1002, in which case, the computer system 1026 can print whether or not it is connected to network router 1012.

Figure 11:
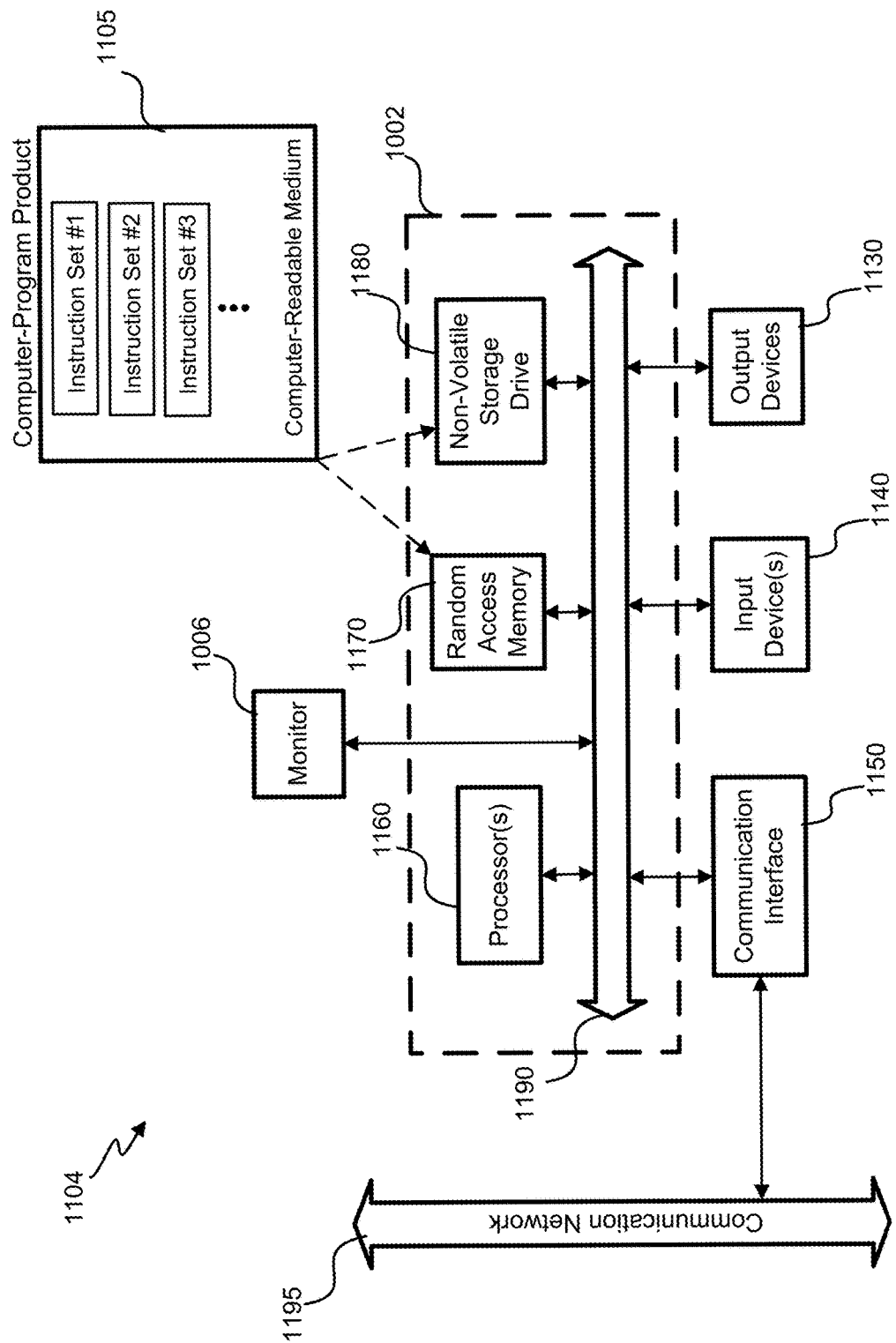
FIG. 11 depicts a block diagram of an embodiment of a special-purpose computer system.

With reference to FIG. 11, an embodiment of a special-purpose computer system 1104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1026, it is transformed into the special-purpose computer system 1104.

Special-purpose computer system 1104 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1104 to perform the above-described methods. Computer 1002 may include one or more processors 1160 that communicate with a number of peripheral devices via a bus subsystem 1190. These peripheral devices may include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 may be stored in non-volatile storage drive 1180 or another computer-readable medium accessible to computer 1002 and loaded into memory 1170. Each processor 1160 may comprise a microprocessor, such as a microprocessor from Intel® or Advanced Micro Devices, Inc.®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft® Corporation, Solaris® from Oracle®, LINUX, UNIX, and the like.

User input devices 1140 include all possible types of devices and mechanisms to input information to computer system 1002. These may include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These may include a display (e.g., monitor 1006), printers, non-visual displays such as audio output devices, etc.

Communications interface 1150 provides an interface to other communication networks 1195 and devices and may serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 may be coupled to a computer network, to a FireWire® bus, or the like. In other embodiments, communications interface 1150 may be physically integrated on the motherboard of computer 1002, and/or may be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 may be configured to store the basic programming and data constructs that provide the functionality of various embodiments of the present invention, as described above.

Software instruction sets that provide the functionality of the present invention may be stored in RAM 1170 and non-volatile storage drive 1180. These instruction sets or code may be executed by the processor(s) 1160. RAM 1170 and non-volatile storage drive 1180 may also provide a repository to store data and data structures used in accordance with the present invention. RAM 1170 and non-volatile storage drive 1180 may include a number of memories including a main random access memory (RAM) to store of instructions and data during program execution and a read-only memory (ROM) in which fixed instructions are stored. RAM 1170 and non-volatile storage drive 1180 may include a file storage subsystem providing persistent (non-volatile) storage of program and/or data files. RAM 1170 and non-volatile storage drive 1180 may also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem may utilize multiple busses or communication paths within the computer 1002.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of generating an individual network-probability based educational path comprising:
   receiving electronic inputs identifying a location of a user at a node within a learning network comprising a plurality of nodes that are interconnected via a prerequisite relationship and that identify learning objectives;
   retrieving a bounding rule defining a maximum degree of inclusion from the identified location within the learning network;
   retrieving an indicator of completion status for nodes within the bounding rule;
   calculating a likelihood of the user successfully completing uncompleted nodes within the bounding rule based on user interaction with completed nodes; and
   recommending a next node based on a comparison of the likelihoods of the user successfully completing uncompleted nodes within the bounding rule based on user interaction with completed nodes.

2. The method according to claim 1, wherein each of the plurality of nodes comprises a task comprising at least one of:
   a learning activity;
   a practice activity; and
   a challenge activity.

3. The method according to claim 1, wherein the bounding rule comprises a Markov blanket.

4. The method of claim 1, wherein the bounding rule comprises a first rule applicable to nodes that are prerequisites of the node of the identified user location within the learning network and a second rule applicable to nodes for which the node of the identified user location is a prerequisite.

5. The method of claim 1, wherein the user interaction with completed nodes comprises:
a number of completed tasks within the identified location of the user;
a number of completed learning activities;
an amount of time user spent on the identified location of the user;
a user score for a practice activity; and
a user score for a challenge activity.

6. The method of claim 5, wherein the likelihood of the user successfully completing uncompleted nodes is further calculated based on the completion status of prerequisites for an uncompleted node.

7. The method of claim 5, wherein calculating the likelihood of the user successfully completing uncompleted nodes within the bounding rule based on user interaction with completed nodes comprises:
selecting an uncompleted node within the bounding rule;
identifying prerequisite nodes of the selected uncompleted node;
retrieving information comprising node information for the prerequisite nodes;
applying a probability function to the retrieved information; and
applying a probability indicator to the uncompleted node based on a result of the application of the probability function to the retrieved information.

8. The method of claim 1, wherein the likelihood of the user successfully completing uncompleted nodes is calculated only for nodes for which the node of the identified user location is a prerequisite.

9. The method of claim 1, wherein retrieving an indicator of completion status for nodes within the bounding rule comprises identifying one or several nodes included within the bounding rule.

10. The method of claim 9, wherein identifying one or several nodes included within the bounding rule comprises:
selecting a starting node, wherein the starting node comprises the node of the identified user location;
identifying connected nodes, wherein the connected nodes are connected with the starting node;
comparing the connected nodes to the bounding rule; and
adding an indicator of node status to each of the identified connected node.

11. A system for generating an individual network-probability based educational path, the system comprising:
one or more hardware servers programmed for:
receiving electronic inputs identifying a location of a user at a node within a learning network comprising a plurality of nodes that are interconnected via a prerequisite relationship and that identify learning objectives;
retrieving a bounding rule defining a maximum degree of inclusion from the identified location within the learning network;
retrieving an indicator of completion status for nodes within the bounding rule;
calculating a likelihood of the user successfully completing uncompleted nodes within the bounding rule based on user interaction with completed nodes; and
recommending a next node based on a comparison of the likelihoods of the user successfully completing uncompleted nodes within the bounding rule based on user interaction with completed nodes.

12. The system for generating an individual network-probability based educational path according to claim 11, wherein each of the plurality of nodes comprises a task comprising at least one of:
a learning activity;
a practice activity; and
a challenge activity.

13. The system for generating an individual network-probability based educational path according to claim 11, wherein the bounding rule comprises a Markov blanket.

14. The system for generating an individual network-probability based educational path according to claim 11, wherein the bounding rule comprises a first rule applicable to nodes that are prerequisites of the node of the identified location of the user within the 4 learning network and a second rule applicable to nodes for which the node of the identified user location is a prerequisite.

15. The system for generating an individual network-probability based educational path according to claim 11, wherein the user interaction with completed nodes comprises at least one of:
a number of completed tasks within the identified location of the user;
a number of completed learning activities;
an amount of time user spent on the identified location of the user;
a user score for a practice activity; and
a user score for a challenge activity.

16. The system for generating an individual network-probability based educational path according to claim 15, wherein the likelihood of the user successfully completing uncompleted nodes is further calculated based on the completion status of prerequisites for an uncompleted node.

17. The system of claim 11, wherein calculating the likelihood of the user successfully completing uncompleted nodes within the bounding rule based on user interaction with completed nodes comprises:
selecting an uncompleted node within the bounding rule;
identifying prerequisite nodes of the selected uncompleted node;
retrieving information comprising node information for the prerequisite nodes;
applying a probability function to the retrieved information; and
applying a probability indicator to the uncompleted node based on the result of the application of the probability function to the retrieved information.

18. The system for generating an individual network-probability based educational path according to claim 11, wherein the likelihood of the user successfully completing uncompleted nodes is calculated only for nodes for which the identified user position is a prerequisite.

19. The system for generating an individual network-probability based educational path according to claim 11, wherein the likelihood of the user successfully completing uncompleted nodes is calculated for both nodes for which the user position is a prerequisite and for nodes for which the identified user position is not a prerequisite.

20. The system of claim 19, wherein identifying one or several nodes included within the bounding rule comprises:
selecting a starting node, wherein the starting node comprises the node of the identified user location;

identifying connected nodes, wherein the connected nodes are connected with the starting node;
comparing the connected nodes to the bounding rule; and
adding an indicator of node status to each of the identified connected node.

* * * * *